(12) United States Patent (10) Patent No.: US 8,607,693 B2
Verbeek (45) Date of Patent: Dec. 17, 2013

(54) DEVICE AND METHOD FOR THE PREPARATION OF A FROTHY LIQUID FOR HUMAN CONSUMPTION

(75) Inventor: Roland Waldemar Verbeek, Blaricum (NL)

(73) Assignee: Jet Liquids GmbH, Zurich (CH)

( * ) Notice: Subject to any disclaimer, the term of this patent is extended or adjusted under 35 U.S.C. 154(b) by 826 days.

(21) Appl. No.: 12/685,216

(22) Filed: Jan. 11, 2010

(65) Prior Publication Data

US 2010/0178406 A1 Jul. 15, 2010

Related U.S. Application Data

(63) Continuation-in-part of application No. PCT/NL2007/000178, filed on Jul. 12, 2007.

(51) Int. Cl.
*A47J 31/41* (2006.01)

(52) U.S. Cl.
USPC ... 99/302 R; 99/323; 99/323.1; 261/DIG. 16; 261/DIG. 76; 426/433

(58) Field of Classification Search
USPC .................... 99/293, 294, 302 R, 323.1, 323; 261/DIG. 16, DIG. 76, 121.1; 426/433
See application file for complete search history.

(56) References Cited

U.S. PATENT DOCUMENTS 5,339,725 A * 8/1994 De'Longhi .................... 99/293
8,225,710 B2 * 7/2012 De Graaff et al. ............. 99/295

FOREIGN PATENT DOCUMENTS

| DE | 20 2004 016 195 U1 | 1/2005 |
|---|---|---|
| EP | 0 169 956 A1 | 2/1986 |
| WO | WO-2004/100739 A1 | 11/2004 |
| WO | WO-2005/016095 A1 | 2/2005 |
| WO | WO-2005/058109 A1 | 6/2005 |
| WO | WO-2006/066622 A1 | 6/2006 |
| WO | WO-2007/043861 A1 | 4/2007 |

* cited by examiner

*Primary Examiner* — Reginald L Alexander
(74) *Attorney, Agent, or Firm* — Birch, Stewart, Kolasch & Birch, LLP

(57) ABSTRACT

A device for the preparation of a frothy liquid for human consumption includes a jet forming nozzle and an inlet of a liquid flow deflecting member arranged on opposed locations with respect to a collision chamber. The jet forming emits a traversing liquid jet that traverses the collision chamber along a path and enters the inlet and passes through to the outlet of the liquid flow deflecting member. The outlet is arranged in communication with the collision chamber and is aimed at the path of the liquid jet between the jet forming nozzle and the inlet, so that in use the liquid jet emerging from the outlet collides with the traversing liquid jet between the jet forming nozzle and the inlet of the liquid flow deflecting member. The collision causes air to be mixed with the liquid thereby generating frothed liquid.

17 Claims, 5 Drawing Sheets

DEVICE AND METHOD FOR THE PREPARATION OF A FROTHY LIQUID FOR HUMAN CONSUMPTION

This application is a Continuation In Part of International Application No. PCT/NL2007/000178 filed on Jul. 12, 2007. The entirety of the above-identified application is incorporated by reference.

FIELD OF THE INVENTION

The invention pertains to the preparation of a frothy liquid which is suitable for human consumption.

BACKGROUND OF THE INVENTION

Many methods and devices have been proposed for the preparation a frothy liquid for human consumption, such as coffee with a layer of fine-bubbled froth, cappuccino, café crème, (hot) chocolate, milk, etc.

For instance in EP 1 169 956 a coffee preparation device is disclosed wherein a buffer volume of coffee extract is received in a buffer reservoir of the device. A jet of coffee extract is jetted into this buffer volume of coffee extract, the collision causing the formation of bubbles in the coffee extract. The coffee extract flows from the buffer reservoir into a cup and a layer of froth, commonly referred to as a crema layer, is obtained on top of the coffee.

For instance in WO2005/058109 the jet of liquid is made to collide with a structural part of the device in order to cause the generation of the froth.

OBJECT OF THE INVENTION

It is the object of the invention to provide an alternative method and apparatus for the preparation of a frothy liquid for human consumption.

SUMMARY OF THE INVENTION

The object is achieved by a device for the preparation of a frothy liquid for human consumption. This device comprises:
a liquid inlet for human consumption liquid to be frothed, said liquid inlet being connectable to a liquid supply,
a jet forming nozzle connected to said liquid inlet and adapted to form a jet of liquid,
a collision chamber,
a liquid flow deflecting member, which liquid flow deflecting member has an inlet, an outlet and a channel which extends between the inlet and the outlet,
the device being adapted to allow for the entry of air into said collision chamber,
wherein the jet forming nozzle and the inlet of the liquid flow deflecting member are arranged on opposed locations with respect to the collision chamber, and wherein the jet forming nozzle is adapted to emit a traversing liquid jet that traverses the collision chamber along a path and enters the inlet of the liquid flow deflecting member and passes through the channel thereof to the outlet of said liquid flow deflecting member, and wherein said outlet of the flow deflecting member is arranged in communication with the collision chamber and aimed at the path of the traversing liquid jet between the jet forming nozzle and the inlet of the liquid flow deflecting member, so that in use the liquid jet emerging from the outlet of the flow deflecting member collides with the traversing liquid jet between the jet forming nozzle and the inlet of the flow deflecting member, said collision causing air to be mixed with the liquid thereby generating frothed liquid,
a discharge passage connected to said collision chamber to discharge the frothed liquid.

The present invention also relates to a method for the preparation of a frothed liquid for human consumption, wherein use is made of the inventive device.

In the device and the method according to the invention, a jet of liquid, such as for example coffee extract, milk or hot chocolate, is created by the jet forming nozzle. This jet of liquid traverses the collision chamber in the device, and is introduced in the flow deflecting member, which has an inlet arranged at a distance from the jet forming nozzle. Between the jet forming nozzle and the inlet of the flow deflecting member the jet traverses the collision chamber. The collision chamber can be partly open to the atmosphere, and so allow for the entry of air.

The channel of the flow deflecting member is such that the direction of the liquid is changed from the inlet to the outlet, and the liquid emitted from said outlet re-enters the collision chamber. In this collision chamber, the jet of liquid leaving the outlet of the flow deflecting member and the jet traversing between the jet forming nozzle and the inlet of the flow deflecting member collide. So effectively the jet of liquid emerging from the jet forming nozzle is made to collide with itself. Due to this collision, air is mixed into the flow of liquid leaving the flow deflecting member, such that froth is generated.

The frothed liquid leaves the collision chamber via the discharge passage and can be collected in for example a cup or the like.

Practice has shown that good quality froth can be obtained by the method and the device according to the invention.

In an advantageous embodiment, the device is further provided with a pad holder for receiving a coffee pad. This makes it possible to obtain a coffee extract by passing hot water through the coffee pad, which coffee extract is then supplied to the jet forming nozzle as the liquid to be frothed. This way, coffee with a good quality crema layer, with small bubbles in the froth, can be obtained.

In order to facilitate the generation of coffee extract, in an even more advantageous embodiment of the device not only a pad holder is provided but also water supply means for supplying hot water under an elevated pressure to the pad holder. The elevated pressure allows the water to be pressed through the coffee pad such that coffee extract is obtained. Preferably the pressure of the supplied water is between 1 and 2 bars. The water that is supplied to coffee pad preferably has a temperature between 80° C. and 100° C.

Preferably, the pad holder is provided with channels that collect the coffee extract on the discharge side of the coffee pad, and guide it to the jet forming nozzle. In an advantageous embodiment, the coffee extract is collected in a collection chamber before it enters the jet forming nozzle. By collecting the coffee extract in a collection chamber before forcing it through the nozzle, a continuous jet is easier to achieve. The collection chamber preferably has a volume of 5 ml to 15 ml.

Also in other embodiments, that do not have a pad holder and/or water supply means, a collection chamber of the type described above can be present.

In an advantageous embodiment, the channel of the flow deflecting member is wide enough to allow the jet of liquid to expand. This means that the channel is wider than the inner diameter of the jet forming nozzle. When the expanded flow of liquid leaves the outlet of the flow deflecting device, the diameter of the flow from the outlet is larger than that of the jet of liquid traversing the collision chamber. This way, the traversing jet of liquid has a high probability of striking the flow of liquid leaving the outlet of the flow deflecting member, even when the jet deviates a bit from its predetermined path, for example because of the presence of calcium carbonate scaling in the jet forming nozzle.

In an advantageous embodiment, the outlet of the flow deflecting member has a smaller cross sectional area than the channel. This helps to direct the flow of liquid that leaves the flow deflecting member.

In practice, it has shown that it is advantageous if the cross section of the outlet has a substantially triangular shape. In case the longitudinal axis of the channel of the flow deflecting member extends along a part of a circle, it is advantageous if the top of the triangle is directed away from the centre of curvature of the channel. Due to centrifugal forces, the flow of liquid in the channel will be guided mainly by that part of the wall of the channel that is furthest away from the centre of curvature. By arranging the triangular shape of the outlet such that the top of the triangle is directed outward, the flow is directed in a reliable way.

It is envisaged that a filter can be provided upstream of the jet forming nozzle. This way, any turbulence that is present in the flow of liquid can be reduced and small particles (such as particles of ground coffee) can be removed from the liquid. The reduction of turbulence accounts for a better flow of liquid through the device according to the invention. The removal of small particles from the liquid helps to avoid blockage of the jet forming nozzle.

The discharge passage may be curved, e.g. so as to extend over an angle between 60° and 90°.

In a possible embodiment the discharge passage has a longitudinal axis, which axis has a length in the range of 10-30 mm, preferably in the range of 15-25 mm.

In a possible embodiment the discharge passage has a longitudinal axis, which axis has at least over a part of its length a radius of curvature in the range of 5-10 mm, preferably of 7.5 mm.

In practice, it has been found that the length of the discharge passage can influence the froth that is formed. In general, it seems to be that the more the flow of liquid is slowed down in this discharge passage, the finer the bubbles of the generated froth become. Parameters influencing the degree to which the jet of liquid is slowed down in the discharge passage are the length of the channel and—if present—the curvature of the discharge passage. The longer the discharge passage is, the more the liquid will be slowed down. For the curvature, both the radius of curvature and the angle over which the curvature extends seem to be of influence. The discharge passage can be provided with one or more curves. As an alternative or in addition, the discharge passage can be provided with internal projections that deflect the liquid flow. Such a discharge passage with internal projections can either be straight or curved.

The present invention also relates to a package for frothable human consumption liquid, said package being provided with the inventive froth generating device.

For example the package can be a collapsible pouch or bag, e.g. to be received in a box of the package when a bag-in-box package is envisaged. The froth generating device is then connected to the outlet of the package.

The package may be filled with said frothable liquid, e.g. in an aseptic manner.

The package may include a pump tube that is adapted to be engaged by a pumping device, e.g. of a dispensing machine, e.g. of a vending machine. The pumping device can e.g. be a peristaltic pump.

The froth generating device can be provided with a connector element to allow for releasable connecting to the liquid supply, e.g. to the outlet of the package. This may facilitate e.g. the cleaning of the froth generating device.

In a possible embodiment the package according to the invention comprises a connector assembly between the froth generating device and the reservoir or pump tube, e.g. a releasable connector assembly. E.g. a connector assembly as disclosed in WO99/05446 or WO95/24972 is applied. For example, the connector assembly comprises a female part, a male part to be connected thereto, and a plug, the female part having a body containing an axial bore which extends from an insert opening for the male part through the body and having a seat, extending around the bore, for the plug, which serves to close off the bore; wherein the bore of the female part between the insert opening and the seat forms a shoulder, facing towards the insert opening, and the plug is provided with at least one elastic hooking part with corresponding hooking surface, the hooking part resting in a first position with its hooking surface against the shoulder; and wherein the male part has a head and a recess located behind the head for receiving the hooking part of the plug when the male part is inserted into the bore, so that the plug connects with the male part.

Provision can be made for flushing the froth generating device with a cleaning medium, e.g. hot water, e.g. at intervals.

The invention will be explained in more detail under referral to the drawing, in which non-limiting embodiments of the invention are shown.

DESCRIPTION OF PREFERRED EMBODIMENTS

Figure 1:
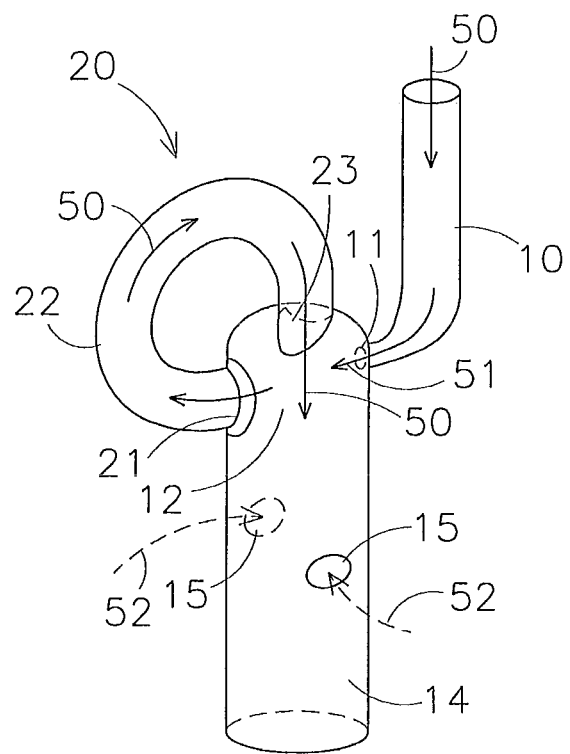
FIG. 1 is a schematic overview of a first embodiment of the invention.

FIG. 1 gives a schematic overview of a first embodiment of the invention.

According to the invention, liquid is supplied to a jet forming nozzle 11, for example via inlet channel 10. The jet forming nozzle 11 forms a jet 51 out of the flow 50 of liquid that is supplied to it. The inlet 21 of a flow deflecting member 20 receives the jet 51 of liquid. The inlet 21 of the flow deflecting member 20 is arranged at a distance from the jet forming nozzle 11. Between the jet forming nozzle 11 and the inlet 21, a collision chamber 12 is present. Channel 22 guides the liquid to the outlet 23 of the flow deflecting member 20.

As the flow 50 of liquid leaves the outlet 23 of the flow deflecting member 20, it collides with the traversing jet 51 of liquid in the collision chamber 12. By this collision, air is mixed into the liquid, which generates a froth. Air 52 is allowed to enter the collision chamber 12 by one or more dedicated air inlets 15 and/or by the discharge passage 14 which can be dimensioned so that it allows both the discharge of frothed liquid and the entry of air (and thus acts as an air inlet). The liquid that is now mixed with air leaves the device via the discharge passage 14. Under the outlet of the discharge passage 14, a cup or the like can be arranged to receive the frothed liquid.

Deflection of the jet 51 of liquid takes place in the channel, at some distance from the jet forming nozzle 11. This way, space is created for the collision chamber 12 in which the collision of the jet 51 of liquid and the flow 50 of liquid leaving the outlet 23 of the flow deflecting member 20 takes place.

In the example of FIG. 1, the outlet 23 of the flow deflecting member 20 has a substantially triangular cross sectional area. The wide side of the triangle is arranged on the side closest to the centre of curvature of the channel 22 of the flow deflecting member 20, while the narrow side (the top) of the triangle is arranged away from the centre of curvature of the channel 22.

It will be understood that it is mainly the outer portion of the wall of the channel 22 (which is furthest away from the centre of curvature of the channel 22) that deflects the direction of the jet 51 of liquid. This allows for an alternative embodiment, which is not shown in the drawing, wherein the inside portion of the channel 22 can be entirely open (e.g. in communication with the collision chamber) or provided with one or more openings.

By providing the outlet 23 of the channel 22 with a triangular cross section as shown in FIG. 1, the flow 50 that leaves the outlet 23 will be forced towards the top of the triangle. This way, the flow of liquid 50 will leave the outlet 23 of the flow deflecting member 20 at a defined location.

The triangular shaped outlet of the flow deflecting member can be applied in all described exemplary embodiments.

Figure 2:
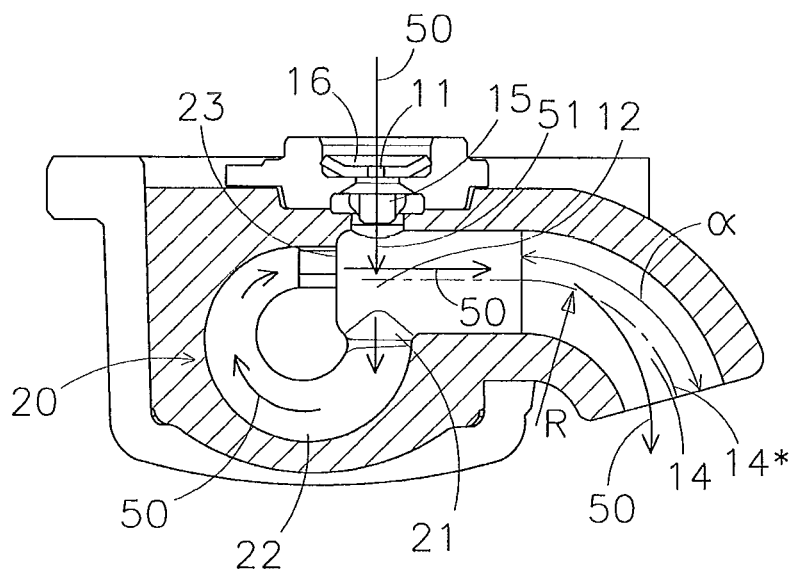
FIG. 2 is a schematic representation of a second embodiment of the invention, in cross section.

FIG. 2 shows a schematic representation of a second embodiment of the invention, in cross section.

In this embodiment, a flow 50 of liquid is supplied to the device according to the invention by liquid supply means (not shown). Liquid supply means as such are known to the person skilled in the art.

The flow 50 of liquid passes through the jet forming nozzle 11. In practice, it has been observed that with a nozzle 11 having a diameter between 0.5 mm and 3 mm, especially with a diameter in the range of 0.8 mm to 2 mm, good results are obtained.

Optionally, upstream of the jet forming nozzle 11, a small collection chamber 16 is arranged. This collection chamber 16 in this embodiment has a volume of only 5 to 15 milliliters. The collection chamber 16 equalizes irregularities in the supply of liquid should they occur. In case the supply of liquid is interrupted for a short time, the jet forming nozzle 11 will be fed by the liquid that is present in the collection chamber 16. Therefore, the forming of the jet 51 will not be interrupted even though the supply of liquid was interrupted for a short time.

The jet 51 formed by the jet forming nozzle 11 is aimed at the inlet 21 of the flow deflecting member 20, which inlet 21 is arranged at some distance from the jet forming nozzle 11. Typically, the distance between the jet forming nozzle 11 and the inlet 21 of the flow deflecting member 20 will be between 1 and 50 mm. The optimal distance is influenced by the properties of the jet, such as the pressure, the speed of the liquid and the diameter of the jet forming nozzle. In practice, a distance of 3 to 8 mm has shown to be suitable when the diameter of the jet forming nozzle is between 0.6 and 0.8 mm. If the diameter of the jet forming nozzle is between 1.8 and 2.2 mm, a distance between 6 and 15 mm has shown to be suitable.

After the inlet 21 of the flow deflecting member 20 receives the jet 51 of liquid from the jet forming nozzle 11, the channel 22 of the flow deflecting member 20 receives the liquid. It is envisaged that the channel 22 is wider than that diameter of the jet 51. When this is the case, the jet 51 will expand at least to some extent in the channel 22 and will in most cases slow down at least to some extent. In that case, the flow 50 of liquid in the channel 22 will not necessarily have the form of a jet 51. Nevertheless, depending on the process conditions, the flow 50 in the channel 22 of could still have the form of a jet of liquid.

In the exemplary embodiment of FIG. 2, the channel 22 is wider than the jet 51 of liquid as received by the inlet 21 of the flow deflecting member. The cross section of outlet 23 of the flow deflecting member 20 preferably has the triangular shape as described in connection with the embodiment of FIG. 1, such that the flow 50 of liquid, either in the form of a jet or in the form of a wider and smaller travelling flow, leaves the flow deflecting member 20 at a more or less defined location.

The channel 22 in the exemplary embodiment of FIG. 2 extends substantially in a circular way. Due to this shape, the flow of liquid is guided in a smooth way to the outlet 23 of the flow deflecting member 20.

The last part of the channel 22 and the outlet 23 of the flow deflecting member 20 are arranged such that the path of the flow (or jet) of liquid that leaves the outlet 22 of the flow deflecting member 20 intersects with the path of the jet 51 formed by the jet forming nozzle 11 in the collision chamber 12. Due to this, the jet 51 as formed by the jet forming nozzle 11 and the flow leaving the outlet 22 of the flow deflecting member 20 collide with each other. By this collision, air is mixed into the flow of liquid leaving the outlet 22 of the flow deflecting member 20 so that a froth is formed.

Air is supplied to the collision chamber 12 by one or more air inlets 15 and/or by the discharge passage 14. It is envisaged that in more elaborate embodiments of the device according to the invention, the size of the air inlet or air inlets 15 can be adjusted, so that the amount of air that is allowed in the collision chamber 12 can be regulated, either manually or automatically. By regulating the amount of air that is allowed in the collision chamber 12, the amount of air that is mixed into the liquid can be regulated. The amount of air that is mixed into the liquid influences the properties of the froth that is formed, such as the size and quantity of the bubbles in the froth. The adjustment of the size of the air inlet can be obtained in any known way, including by manual setting and/or by active control means.

The liquid from the collection chamber 16 is forced through the jet forming nozzle 11 by a pressure that is applied to said liquid. Typically, this pressure is between 1 and 2 bars. Due to the pressure that helps forming the jet 51, the jet 51 is not or hardly affected by the collision with the flow 50 leaving the outlet 22 of the flow deflecting member 20.

Liquid with air mixed into it leaves the embodiment of FIG. 2 by discharge passage 14. The shape of the discharge passage has shown to influence the properties of the froth. If the discharge passage is adapted to slow down (that is: to reduce the flow rate of) the frothed liquid, froth with relatively small bubbles is obtained. One of the parameters that influences the size of the bubbles in the froth is the length of the discharge passage 14. If there is just a short discharge passage, large amounts of large bubbles are obtained. A longer discharge passage, for example of 15 to 25 mm long, results in a froth with smaller bubbles.

In the example of FIG. 2, the longitudinal axis 14\*, which is in the centre of the discharge passage 14 as shown in FIG. 2, is over a part of its length curved over an angle α of 75° with a radius R of curvature of 7.5 mm.

Figure 7:
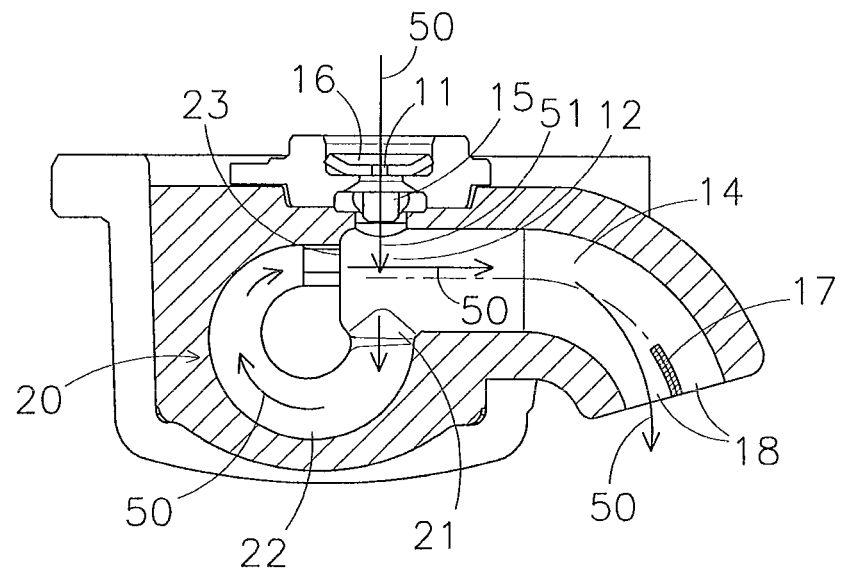
FIG. 7 shows an alternative embodiment of the discharge passage, FIG. 8 another alternative of the discharge passage, FIG. 9 schematically a bag-in-box package filled with frothable human consumption liquid, including a froth generating device according to the invention.
Figure 8:
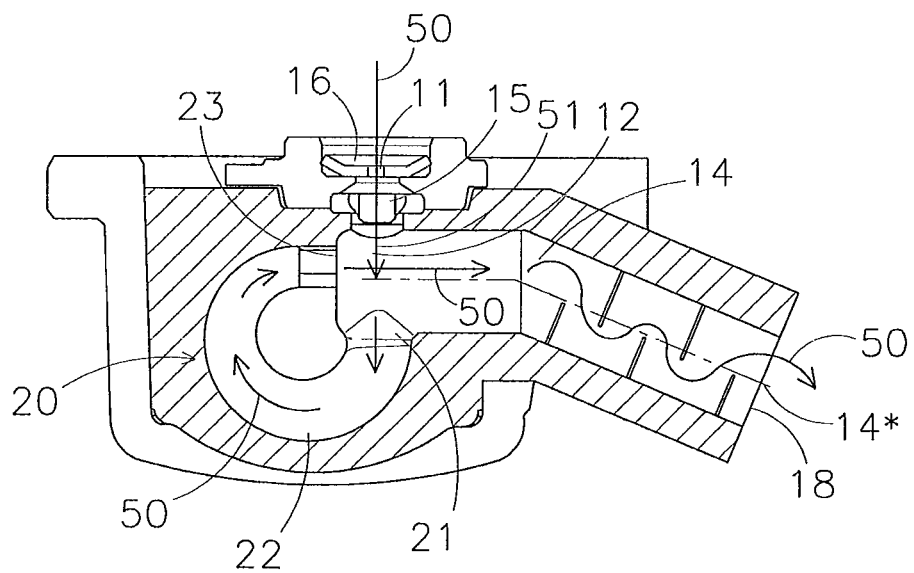

FIG. 7 and FIG. 8 show alternative embodiments of the discharge passage 14. In FIG. 7, the discharge passage is provided with a division 17 near the discharge opening 18. This helps to slow down the flow of frothed liquid in the discharge passage 14. In the embodiment of FIG. 8 a straight discharge passage is provided, in which internal protrusions 19 are present. The flow 50 is slowed down because it has to meander around these protrusions 19 to reach the discharge opening 18. Protrusions 19 can also be applied in a curved discharge passage. As an alternative or in addition, the diameter of the discharge opening 18 can be smaller than the diameter of the discharge passage 14. This also helps to slow down the flow rate of the frothed liquid.

Figure 3:
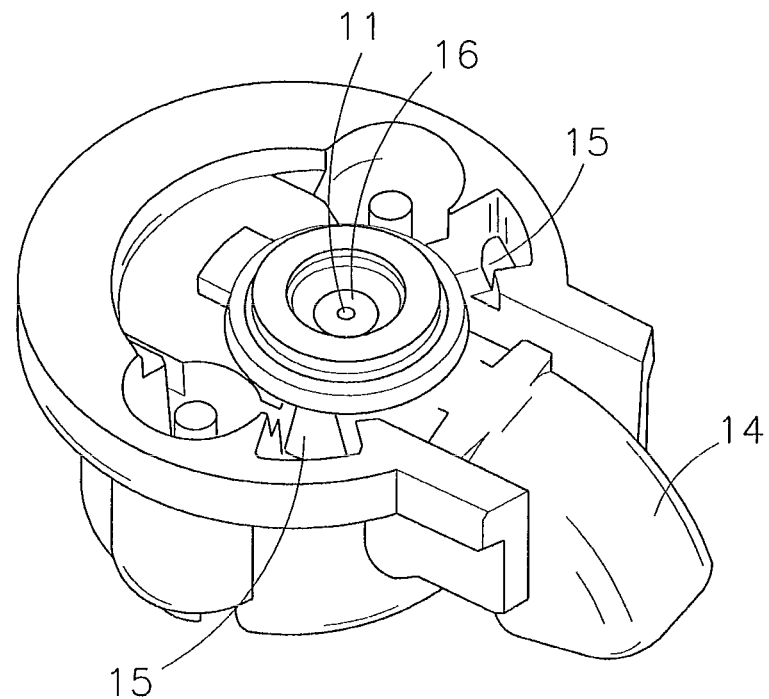
FIG. 3 is a schematic representation of the second embodiment of the invention as shown in FIG. 2, in an isometric elevation.

FIG. 3 shows a schematic representation of the second embodiment of the invention according to FIG. 2, in an isometric elevation.

FIG. 3 shows the presence and arrangement of two air inlets 15.

Figure 4:
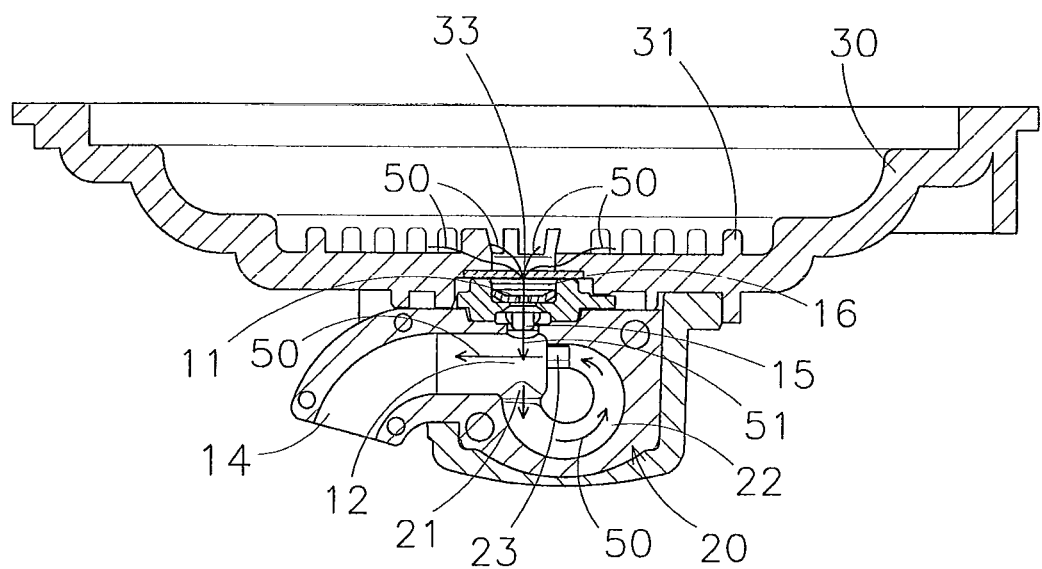
FIG. 4 is a schematic representation of a third embodiment of the invention, in cross section.

FIG. 4 shows a schematic representation of a third embodiment of the invention, in cross section. This embodiment is in particular suitable for generating a coffee extract with a layer of fine bubbled-froth.

In this embodiment, the device is provided with a pad holder 30. This pad holder 30 is adapted for receiving a coffee pad. The pad holder 30 can be closed by a lid (not shown). The device according to FIG. 4 is further provided with water supply means (also not shown) for supplying warm water under an elevated pressure to the pad holder. Typically, this pressure is between 1 and 2 bars. The pressure forces the warm water through the coffee pad such that coffee extract is obtained in a manner that is known per se. Preferably, in this embodiment, the device is further provided with a water heating unit for giving the water the desired temperature for obtaining coffee extract, such as between 80 and 100 degrees Celsius. Such a water heating unit can for example comprise a heating spiral or a flow through heater.

The pad holder 30 is provided with protrusions 31 for supporting the coffee pad. Between the protrusions 31, channels 32 (see FIG. 5) are present. The channels 32 bring the coffee extract towards the jet forming nozzle 11.

Before it reaches the jet forming nozzle, the coffee extract passes through filter 33. This filter 33 is arranged upstream of the jet forming nozzle 11. In this case, the filter's main purpose is to remove small coffee particles from the coffee extract before the coffee extract reaches the jet forming nozzle 11.

A filter 33 can also be applied in the other embodiments shown.

In this example, between the filter 33 and the jet forming nozzle 11, an optional collection chamber 16 is arranged.

In the embodiment of FIG. 4, the jet forming nozzle 11 and the flow deflecting member 20 operate in the same way as in the embodiment of FIG. 2.

Figure 5:
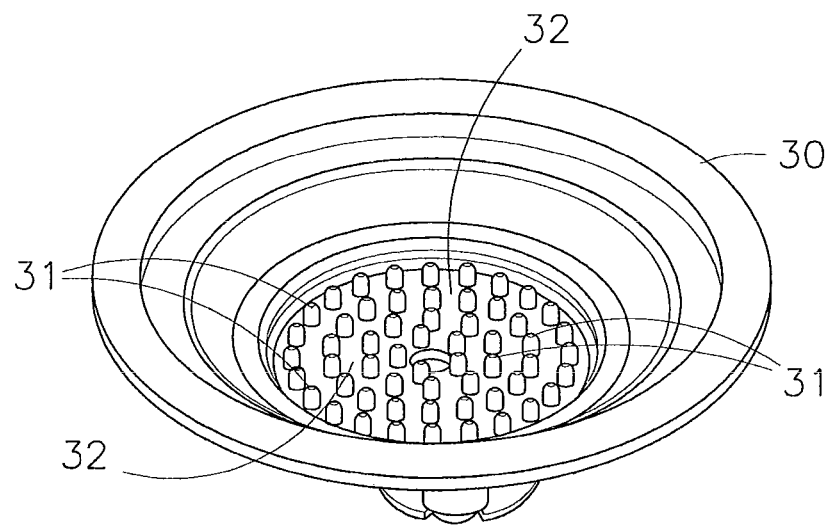
FIG. 5 shows a pad holder, combined with the invention, in top view.

FIG. 5 shows a pad holder, combined with the invention, in top view. In FIG. 5, the protrusions 31 and the channels 32 between them are clearly visible.

Figure 6:
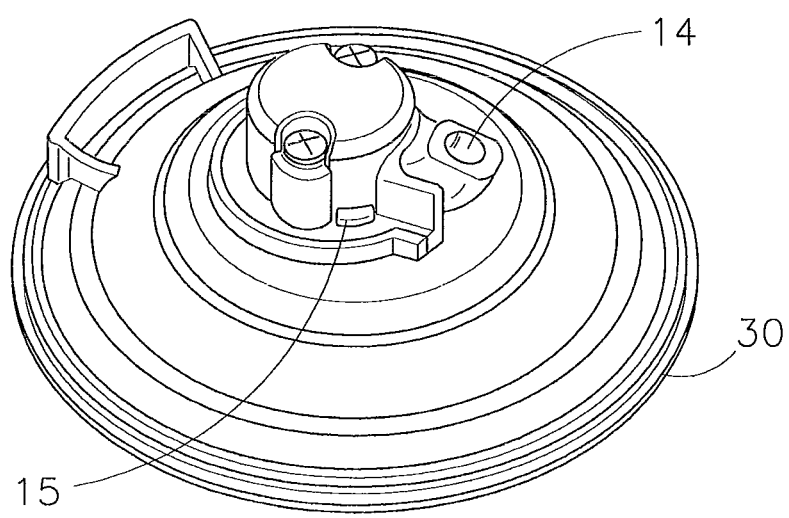
FIG. 6 shows the pad holder of FIG. 5, combined with the invention, in bottom view.

FIG. 6 shows the pad holder of FIG. 5, combined with the invention, in bottom view. In FIG. 6, the air inlets 15 and the discharge passage 14 are clearly visible.

Figure 9:
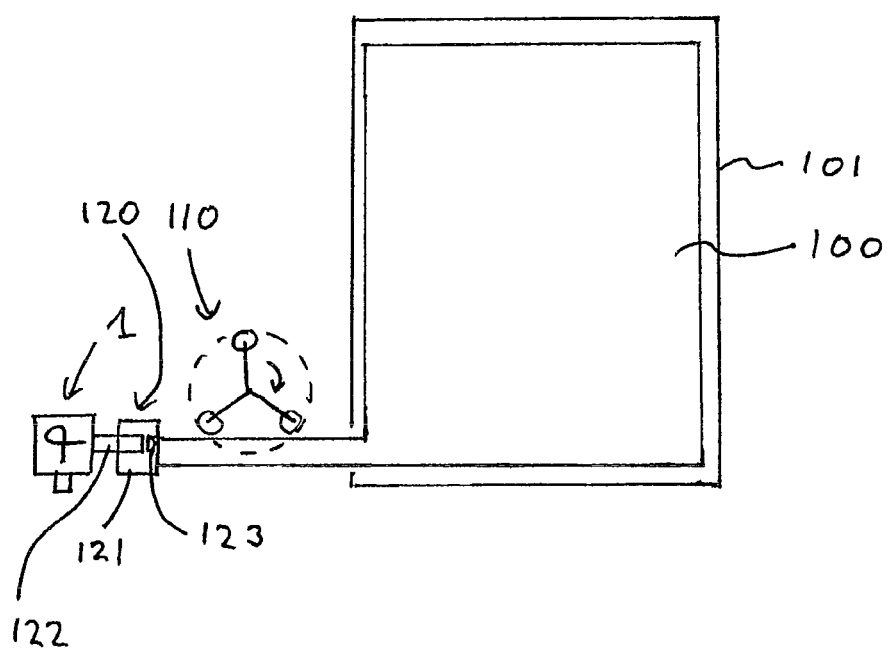

FIG. 9 schematically shows a bag-in-box package filled with frothable human consumption liquid, including a froth generating device according to the invention.

The package includes a collapsible bag or pouch 100 which is filled with said liquid. Preferably no air is present within the bag 100, only said frothable human consumption liquid.

The bag 100 in this example is received in a box 101, so that a bag-in-box package is provided.

In this example discharge of the liquid from the package is effected by an external pump device 110, e.g. a pump device of a vending machine, here a peristaltic pump device 110.

The package 100 here includes a pump tube 103 connected to the main reservoir of the package 100, the pump tube 103 being engaged by the pump device 110, here the peristaltic pump device 110.

The froth generating device 1, e.g. a schematically shown in any of the preceding figures, here is shown to be connected to the package via a connector assembly 120, e.g. a connector assembly allowing the disconnection of the device 1 from the pump tube even while liquid is still present in the reservoir.

For instance a connector assembly having a female part 121, a male part 122 to be connected thereto, and a plug 123 is used. The female part has a body containing an axial bore which extends from an insert opening for the male part through the body and having a seat, extending around the bore, for the plug, which serves to close off the bore when the male part is removed from the bore.

It will be appreciated that the froth generating device according to the invention may be integrated in a dispensing machine, e.g. a vending machine, the package filled with frothable liquid being connectable to the froth generating device.

What is claimed is:
1. A device for the preparation of a frothy liquid for human consumption, the device comprising:
   a liquid inlet for human consumption liquid to be frothed, said liquid inlet being connectable to a liquid supply,
   a jet forming nozzle connected to said liquid inlet and adapted to form a jet of liquid,
   a liquid flow deflecting member, which liquid flow deflecting member has an inlet, an outlet and a channel which extends between the inlet and the outlet,
   a collision chamber arranged between the jet forming nozzle and the inlet of the liquid flow deflecting member,
   one or more air inlets in communication with the collision chamber for the entry of air into said collision chamber, and
   a discharge passage connected to said collision chamber to discharge the frothed liquid,
   wherein the jet forming nozzle and the inlet of the liquid flow deflecting member are in communication with the collision chamber and are arranged on opposed locations with respect to the collision chamber, and wherein the jet forming nozzle is adapted to emit a traversing liquid jet that traverses the collision chamber along a path and enters the inlet of the liquid flow deflecting member and passes through the channel thereof to the outlet of said liquid flow deflecting member,
   and wherein said outlet of the liquid flow deflecting member is arranged in communication with the collision chamber and aimed at the path of the traversing liquid jet between the jet forming nozzle and the inlet of the liquid flow deflecting member, so that in use the liquid jet emerging from the outlet of the flow deflecting member collides with the traversing liquid jet between the jet forming nozzle and the inlet of the liquid flow deflecting member, said collision causing air to be mixed with the liquid thereby generating frothed liquid.

2. The device according to claim 1, wherein the jet forming nozzle has an inner diameter, and wherein the channel of the flow deflecting member is wider than the inner diameter of the jet forming nozzle.

3. The device according to claim 2, wherein the channel of the flow deflecting member is at least 1.5 times wider than the inner diameter of the jet forming nozzle.

4. The device according to claim 1, wherein a longitudinal axis of the channel of the flow deflecting member follows a curved path.

5. The device according to claim 4, wherein the path of the longitudinal axis of the channel of the flow deflecting member extends along at least a part of a circle.

6. The device according to claim 1, wherein a filter is provided upstream of the jet forming nozzle.

7. The device according to claim 1, wherein the jet forming nozzle is arranged such that the emitted liquid jet is directed substantially vertical.

8. The device according to claim 1, wherein the outlet of the flow deflecting member is arranged such that the flow of frothed liquid leaves said outlet in a substantially horizontal direction.

9. The device according to claim 1, wherein the outlet of the flow deflecting member has a substantially triangular cross section.

10. Device according to claim 1, wherein the discharge passage is dimensioned to allow the entry of air into the collision chamber and thus acts as one of the one or more air inlets.

11. The device according to claim 1, wherein the device has one or more air inlets in communication with the collision chamber near the jet forming nozzle.

12. A package to be filled with frothable liquid suitable for human consumption, said package including a reservoir to be filled with said liquid and an outlet, wherein package further includes a device according to claim 1 arranged at said outlet.

13. The package according to claim 12, wherein said reservoir is a collapsible pouch.

14. The package according to claim 12, wherein the package includes a pump tube between said reservoir and the device, said pump tube being engageable with a pump device.

15. The package according to claim 13, wherein said package includes a box in which said collapsible pouch is received.

16. The package according to claim 12, wherein said package is filled with said frothable liquid.

17. A method for generating a frothy liquid for human consumption, wherein use is made of a device for the preparation of a frothy liquid for human consumption, the device including:

a liquid inlet for human consumption liquid to be frothed, said liquid inlet being connectable to a liquid supply, a jet forming nozzle connected to said liquid inlet and adapted to form a jet of liquid, a liquid flow deflecting member, which liquid flow deflecting member has an inlet, an outlet and a channel which extends between the inlet and the outlet, a collision chamber arranged between the jet forming nozzle and the inlet of the liquid flow deflecting member, one or more air inlets in communication with the collision chamber for the entry of air into said collision chamber, and a discharge passage connected to said collision chamber and discharging the frothed liquid, wherein the jet forming nozzle and the inlet of the liquid flow deflecting member are in communication with the collision chamber and are arranged on opposed locations with respect to the collision chamber, and wherein the jet forming nozzle emits a traversing liquid jet that traverses the collision chamber along a path and enters the inlet of the liquid flow deflecting member and passes through the channel thereof to the outlet of said liquid flow deflecting member, and wherein said outlet of the flow deflecting member is arranged in communication with the collision chamber and aimed at the path of the traversing liquid jet between the jet forming nozzle and the inlet of the liquid flow deflecting member, so that the liquid jet emerging from the outlet of the flow deflecting member collides with the traversing liquid jet between the jet forming nozzle and the inlet of the flow deflecting member, said collision causing air to be mixed with the liquid thereby generating frothed liquid, the method comprising:

supplying liquid to the jet forming nozzle via the liquid inlet, forming a liquid jet out of the liquid supplied to the jet forming nozzle, emitting the liquid jet from the jet forming nozzle to traverse the collision chamber along a path to enter the inlet of the liquid flow deflecting member and to pass through the channel thereof to the outlet of said liquid flow deflecting member, colliding the liquid leaving the flow deflecting member in the collision chamber with the traversing liquid jet between the jet forming nozzle and the inlet of the liquid flow deflecting member to cause air to be mixed with the liquid to generate frothed liquid, discharging the frothed liquid from the device via the discharge passage.

* * * * *